US009894632B2

(12) United States Patent
Kouridakis et al.

(10) Patent No.: US 9,894,632 B2
(45) Date of Patent: Feb. 13, 2018

(54) HANDLING OF SUBSCRIBER DEREGISTRATION

(71) Applicant: Telefonaktiebolaget L M Ericsson (publ), Stockholm (SE)

(72) Inventors: Kostas Kouridakis, Athens (GR); Thanasis Sipsas, Athens (GR)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 195 days.

(21) Appl. No.: 14/497,956

(22) Filed: Sep. 26, 2014

(65) Prior Publication Data

US 2015/0094060 A1    Apr. 2, 2015

(30) Foreign Application Priority Data

Sep. 27, 2013  (EP) .................................... 13186293

(51) Int. Cl.
*H04W 60/06*    (2009.01)
*H04W 60/04*    (2009.01)
*H04W 88/14*    (2009.01)

(52) U.S. Cl.
CPC ............ *H04W 60/06* (2013.01); *H04W 60/04* (2013.01); *H04W 88/14* (2013.01)

(58) Field of Classification Search
CPC ...... H04W 60/06; H04W 60/04; H04W 88/14
See application file for complete search history.

(56) References Cited

U.S. PATENT DOCUMENTS

2003/0176182 A1* 9/2003 Cerami ................ G06Q 20/102
455/414.1

FOREIGN PATENT DOCUMENTS

| EP | 2293630 A1 | 3/2011 |
| EP | 2348687 A1 | 7/2011 |
| WO | 9744945 A2 | 11/1997 |

OTHER PUBLICATIONS

ETSI TS 123 012 V10.1.0 (Jun. 2011) Technical Specification Digital cellular telecommunications system (Phase 2+); Universal Mobile Telecommunications System (UMTS); Location management procedures (3GPP TS 23.012 version 10.1.0 Release 10).*

* cited by examiner

*Primary Examiner* — Marcos Torres
(74) *Attorney, Agent, or Firm* — Murphy, Bilak & Homiller, PLLC

(57) ABSTRACT

A system, methods, node, and non-transitory computer readable medium storing a computer program, for deregistration of a user equipment from the source control node are described. The user equipment is registered in the source control node and in a subscriber database while roaming from the source control node to a target control node. The method in the source control node comprises receiving an identification request message from the target control node, the identification request requesting identification and security related information. The method in the source control node further comprises, as triggered by the identification request message, starting a time supervision supervising reception of a cancel location message from the subscriber database. When the time supervision expires, the user equipment is deregistered from the source control node.

8 Claims, 6 Drawing Sheets

HANDLING OF SUBSCRIBER DEREGISTRATION

TECHNICAL FIELD

The present invention relates to telecommunications and in particular to a system, methods, nodes and computer program for deregistration of a user equipment from a source control node.

BACKGROUND

A Location Update procedure concerns one of the most significant mobility management procedures of the UE (user equipment) inside a mobile network according to the GSM (Global System for Mobile communications)/3GPP ($3^{rd}$ Generation Partnership Project) standards. With this procedure, the mobile network has the knowledge on the location of the UE and subsequently the mobile network can apply the various mobile procedures such as calls, Short Message Services, Supplementary Services, location requests, etc.

Each time a UE is registered in a MSC (Mobile Switching Center) node (i.e. it is registered in a VLR (Visited Location Register) service area of the MSC node), the MSC requests subscription information from a HLR (Home Location Register), and at the same time the MSC informs the HLR about the location of the UE. In the successful location update scenario, HLR downloads to the VLR the subscriber's service profile in form of subscriber data.

If the UE is changing the VLR service area, so the UE is registered in a new/target MSC, the previously mentioned process for registration is repeated in the target MSC. In addition to the previous process, HLR orders cancellation of the location of the subscriber in the previous/source MSC. The cancellation of the location of the subscriber in the source MSC results into deregistration of the subscriber, i.e. removal of subscriber data, from the source MSC. This procedure allows the mobile network to keep the location and subscription of the user unique in the networks, i.e. it keeps only the latest location of the UE. Furthermore, this procedure ensures that a subscriber is always registered in a single MSC only.

With the success of the GSM standards based mobile networks worldwide, roaming of UEs can happen between various mobile networks worldwide. So when roaming in visited networks, or when roaming between visited networks of different countries, it can happen that the source MSC, the target MSC, and the HLR are located in different networks of different countries. In this case the signaling of mobility management procedures may traverse a single or even multiple instances of intermediate networks. The condition and quality of intermediate networks may have an impact on the delivery of signaling messages, or may even cause loss of entire signaling messages.

If the location cancellation procedure as a result of location update procedure in a target MSC service area fails, or is not possible due to intermediate networks, MSC, or HLR problems, this may cause problems for the stability of the networks. So if the cancel location message from HLR to source MSC gets lost, the subscriber will remain registered in the source MSC. This means that the subscription of the subscriber is not unique in the mobile network, resulting to capacity and subscription issues in MSCs. Also if the location update request to a target MSC fails, while the HLR has updated the UE location to the target MSC service area and the UE returns to the source MSC, the loss of the cancel location message from HLR to source MSC may cause wrong location information in the HLR.

SUMMARY

In view of the above-said a need exists to improve the deregistration of a UE from a source control node.

The objects defined above are solved by the features of the independent claims. Preferred embodiments of the invention are described in the dependent claims.

According to an exemplary aspect of the invention, a method in a source control node for deregistration of a user equipment from the source control node is provided. The user equipment is registered in the source control node and in a subscriber database while roaming from the source control node to a target control node. The method comprises receiving an identification request message from the target control node, the identification request requesting identification and security related information. The method further comprises starting, triggered by the identification request message, a time supervision supervising a reception of a cancel location message from the subscriber database. The method further comprises deregistering, when the time supervision expires, the user equipment from the source control node.

According to another exemplary aspect of the invention, a source control node for deregistration of a user equipment from the source control node is provided. The user equipment is registered in the source control node and in a subscriber database while roaming from the source control node to a target control node. The method comprises receiving an identification request message from the target control node, the identification request requesting identification and security related information. The method further comprises starting, triggered by the identification request message, a time supervision supervising a reception of a cancel location message from the subscriber database. The method further comprises deregistering, when the time supervision expires, the user equipment from the source control node.

According to another exemplary aspect of the invention, a system for deregistration of a user equipment from a source control node is provided. The user equipment is registered in the source control node and in a subscriber database while roaming from the source control node to a target control node. The system comprises a source control node, a target control node, and a subscriber database.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
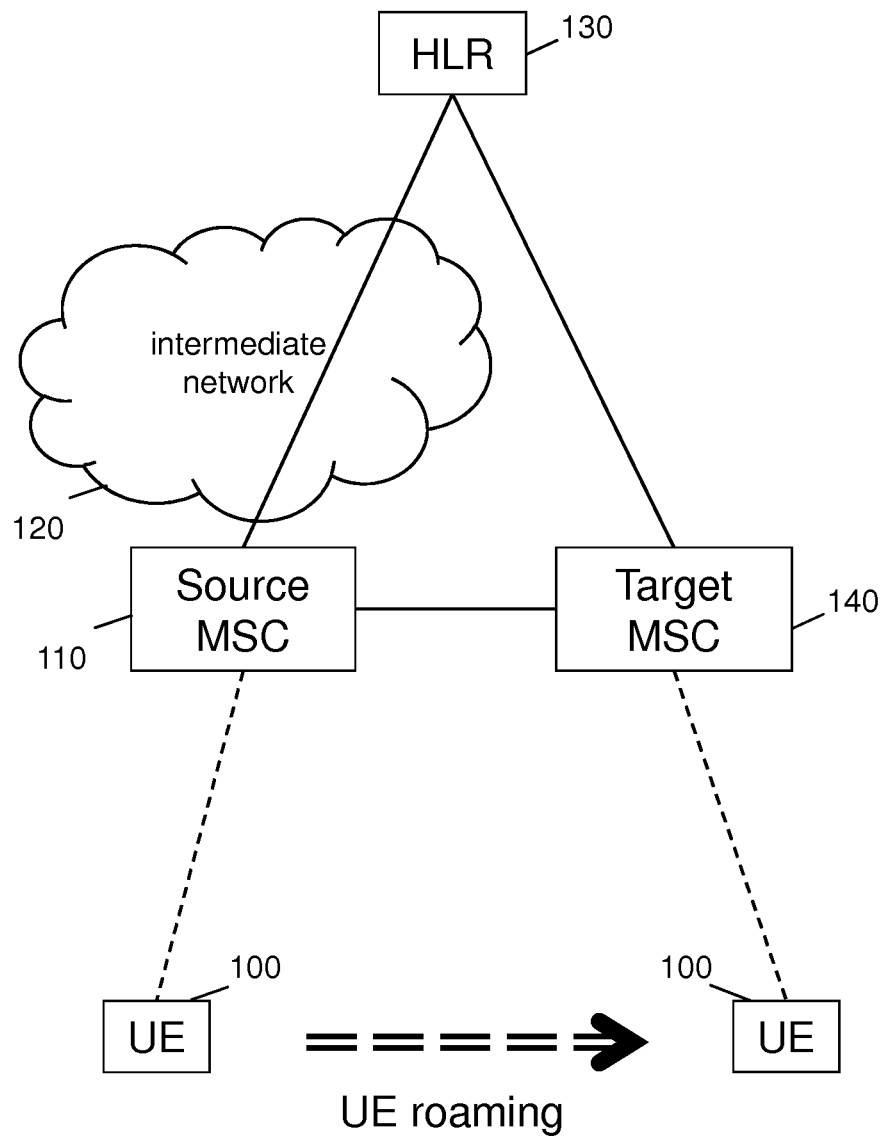
FIG. 1 shows a diagram illustrating a system for deregistration of a user equipment from the source control node.

In the following, a system, methods, nodes, and computer programs for deregistration of a user equipment from a source control node according to the invention are described in more detail.

Within the context of the present application, the term "communication network" or "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as GSM, 3G, WCDMA, CDMA, LTE, 802.11), mobile backhaul network, or core network (such as IP Multimedia Subsystem, Circuit Switched, Packet Core).

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may be a MSC, Mobility Management Entity (MME), P-CSCF, S-CSCF, or TAS nodes.

Within the context of the present application, the term "user equipment" (UE) refers to a device for instance used by a person for his or her personal communication. It can be a telephone type of device, for example a fixed telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "subscriber database" refers to a database run by the network operator to store the information related to the subscribers of a network run by the operator. A subscriber database can be for example a Home Location Register, HLR, or a Visited Location Register, VLR, or a Home Subscriber Server, HSS, or a combination of HLR and HSS. A subscriber database may also be internally structured into a front end part handling the signaling with the other network nodes of the communication network and a generic database for storage of the data according to data layered architecture principles.

Within the context of the present application, the term "roaming" refers to a movement of a UE within a communication network. In order to receive services, the UE is registered in a control node being responsible for the geographical area where the UE is currently located. While moving, the UE may leave the responsibility area of the first control node, the so called source control node, and enter the responsibility area of a second control node, the so called target control node. If this movement happens while the UE is engaged in a call, this movement is denoted as handover, because the ongoing call is handed over from the source control node to the target control node. If this movement happens while the UE has no call ongoing, this movement is denoted as roaming. In this case the registration of the UE into the control node has to be shifted over from the source control node to the target control node. In a circuit switched communication network the control nodes are typically MSC nodes.

Within the context of the present application, the term "MSC" refers to a control node of the circuit switched communication network. The MSC may be combined with a VLR and be therefore also called MSC/VLR. The MSC node may also be enabled to control a remote MGW (Media Gateway) and therefore act as a server and may therefore be also called MSC Server or short MSC-S. Within the context of the present application MSC, MSC/VLR and MSC-S are functional equivalent.

Within the context of the present application, the term "intermediate network" refers to a network that is used to transfer signaling messages between two further networks. The intermediate network is not controllable by the two further networks. In the simplest form the intermediate network may be a single or multiple signaling links. There may be one or several signaling transfer points handling the signaling messages transferred between the two further networks. Within the context of the present application, the intermediate network may also be a concatenation of several intermediate networks, such that a signaling message transferred between the two further networks has to traverse all these intermediate networks. In general there are agreements between operators of networks on what quality of service a network acting as intermediate network offers. However, these quality of service agreements are of statistical nature and do not guarantee the save delivery of single signaling messages and do not exclude short periods of outage.

Referring now to FIG. 1, this figure shows a diagram illustrating a system for deregistration of a user equipment from the source control node according to an embodiment.

Therein, the user equipment may correspond to the UE 100 and the source control node may correspond to the source MSC 110.

The UE 100 is registered in the source MSC 110 and in a subscriber database while roaming from the source MSC 110 to a target control node. The subscriber database may correspond to the HLR 130 and the target control node may correspond to the target MSC 140.

The source MSC 110 and the target MSC 140 have a signaling relation with the HLR 130 for performing the mobility procedure. The source MSC 110, the target MSC 140, and the HLR 130 may be part of different networks, or even be located in different countries. Another scenario may be that the source MSC 110 and the target MSC 140 are located in a first network of a first country, while the HLR 130 is located in a further network, the home network of the subscriber using the UE 100.

In this embodiment it is assumed that the source MSC 110 and the HLR 130 are interconnected via an intermediate network 120 responsible for transferring signaling messages between the source MSC 110 and the HLR 130.

Also the source MSC 110 and the target MSC 140 have a signaling relation used for delivery of identification and security related information. In order to avoid the sending of the subscriber identity, which corresponds to an IMSI, over the air interface, the source MSC 110 has allocated a TMSI to the UE 100. When the UE 100 roams into the service area of the target MSC 140, the UE 100 also uses this TMSI towards the target MSC 140. Since the target MSC 140 has no knowledge of this TMSI (since it was generated and allocated by the source MSC 110), the target MSC 140 requests the IMSI associated with this TMSI from the source MSC 110. This request is then also used to transfer security related information. Each time a UE accesses a MSC, the MSC authenticates that the UE is allowed to access. This authentication is done using pre-calculated authentication vectors. This pre-calculation is done in a central AUC (Authentication Center). Since the authentication vectors have a limited lifetime/usage and the production of authentication vectors is capacity consuming, unused authentication vectors, which may correspond to the security related information, are transferred along with the subscriber identity IMSI from the source MSC 110 to the target MSC 140.

Figure 2:
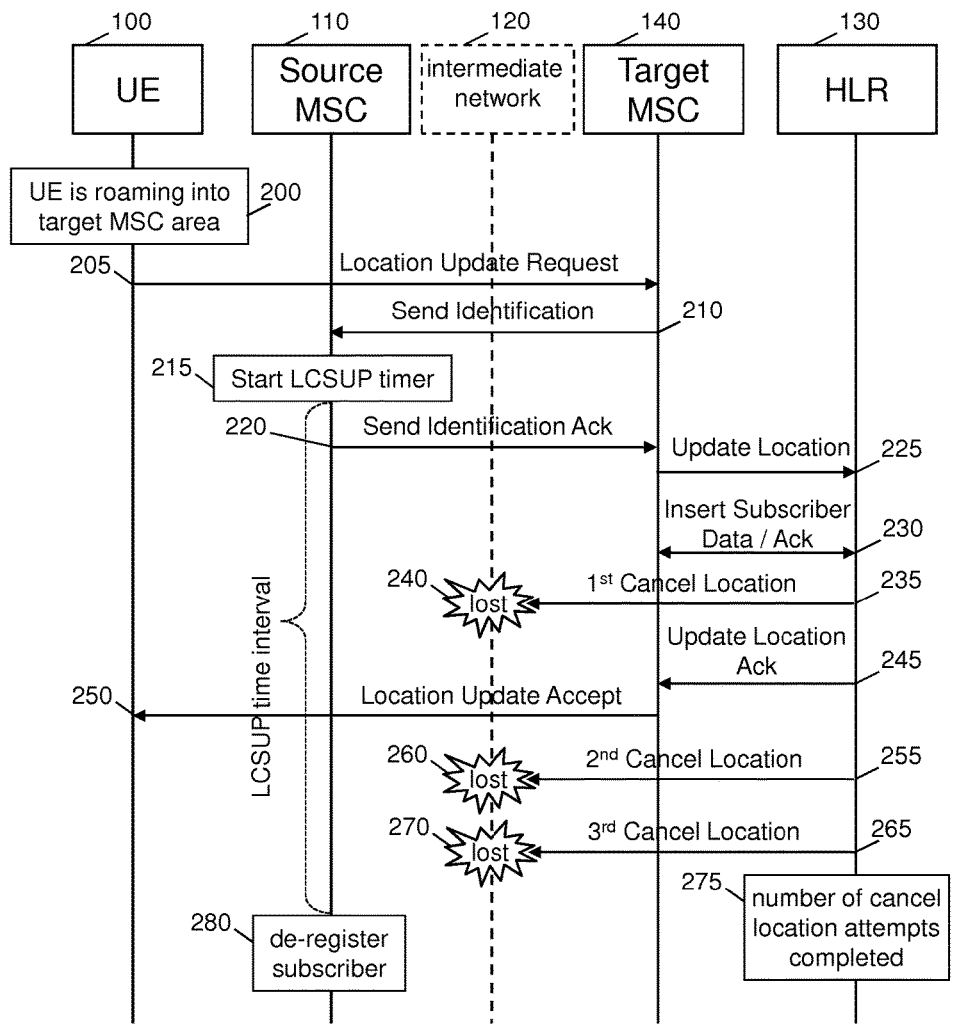
FIG. 2 shows a procedure flow diagram illustrating a procedure of deregistration of a user equipment from the source control node according to the invention.

Referring now to FIG. 2, this figure shows a procedure flow diagram illustrating a procedure of deregistration of a user equipment from the source control node according to an embodiment.

The procedure flow is triggered by the UE 100 roaming 200 into the coverage area of the target MSC 140. When the UE 100 determines this, the UE 100 sends a Location Update Request message 205 to the target MSC 140. The Location Update Request message 205 may be a corresponding protocol message as defined on the A-interface or Iu-interface between a MSC and a UE across a radio access network. The protocol may correspond to DTAP (Direct Transfer Application Part) or RANAP (Radio Access Network Application Part). The Location Update Request message 205 may also correspond to a BSSAP+ (Base Station Subsystem Application Part+) protocol on a Gs-interface between a MSC and a SGSN (Serving Gateway Support Node), when combined circuit switched- and packet switched-location update procedures are used.

The target MSC 140 receives the Location Update Request message 205 from the UE 100. Since this Location Update Request message 205 comprises a TMSI, the target MSC 140 has to fetch the subscriber identity IMSI from the source MSC 110. Along with the request for the identity, the target MSC 140 also requests security related information. The target MSC 140 may use a MAP (Mobile Application Part) message Send Identification 210 for this.

The source MSC 110 thus receives an identification request message 210 from the target MSC 140, the identification request requesting identification and security related information. The identification request message 210 comprises a TMSI of the UE 100. The source MSC 110 then determines the IMSI associated with the received TMSI of the UE 100.

The source MSC 110 then starts 215, triggered by the identification request message 210, a time supervision supervising a reception of a cancel location message from the HLR 130. Such time supervision may be accomplished for example by a timer, by using a time stamp, or any other suitable means to supervise the lapse of a time interval. In the embodiment, the timer related to the time supervision supervising a reception of a cancel location message is called LCSUP (Location Cancellation Supervision) timer.

The source MSC 110 then returns the determined identity and the security related information to the target MSC 140 by sending a Send Identification Acknowledgement 220. The source MSC 110 may use MAP message Send Identification Acknowledgement 220 for this.

When the target MSC 140 has received the identity and the security related information in the Send Identification Acknowledgement 220, it performs the mobility procedure towards the HLR by sending Update Location message 225 to the HLR 130. The Update Location 225 message may use a MAP protocol.

The HLR 130 receives the Update Location message 225 and provides the related subscriber data in one or several Insert Subscriber Data messages 230 to the target MSC 140. The Insert Subscriber Data messages 230 may use a MAP protocol.

The HLR 130 then sends a request 235 for cancelling the location registration of the UE 100 to the source MSC 110. The Cancel Location message 235 may correspond to a MAP protocol message. The signaling messages from the HLR 130 to the source MSC 110 have to traverse through the intermediate network 120. Here it is assumed that the Cancel Location message 235 gets lost 240 in the intermediate network 120, so the Cancel Location message 235 is not received by the source MSC 110.

The HLR 130 then sends an Update Location Acknowledgement 245 to the target MSC 140. The Update Location Acknowledgement 245 may use a MAP protocol.

The target MSC 140 receives the Update Location Acknowledgement 245 and accepts the location update request from the UE 100 by sending a Location Update Accept message 250 to the UE 100. At this point the location update procedure has successfully finished and the HLR 130 stores the target MSC 140 as the valid location of the UE 100 and also the target MSC 140 holds a valid registration of the UE 100.

Since the HLR 130 did not receive any Cancel Location Acknowledgement from the source MSC 110 so far, it is re-sending after a certain time interval the Cancel Location message 255 to the source MSC 110. This Cancel Location message 255 may take the same path through the intermediate network 120 and may also be lost 260.

Since the HLR 130 still did not receive any Cancel Location Acknowledgement from the source MSC 110, it is again re-sending after a certain time interval the Cancel Location message 265 to the source MSC 110. This Cancel Location message 265 may also take the same path through the intermediate network 120 and may also be lost 270.

After HLR 130 has done a pre-defined number of re-sending attempts of the Cancel Location messages, the number of cancel location attempts is completed and the HLR 130 gives up, so the HLR 130 will not make any further re-attempt. The number of cancel location attempts may be configured by the operator in the HLR 130. In this embodiment, the re-attempts are limited to two re-sendings.

For the overall function it is beneficial if an interval constructed by the re-sending time interval multiplied with the number of cancel location re-attempts is about the same length as the LCSUP timer interval. This enables that the UE 100 is de-registered at the same time when the HLR 130 gives up sending cancel location re-attempts.

Since the source MSC 110 has still not received any Cancel Location message so far, it still holds a valid registration of UE 100. The method now comprises deregistering 280, when the time supervision expires, the UE 100 from the source MSC 110.

The LCSUP timer is started in the source MSC 110 at reception of the Send Identification message 210. When the LCSUP timer expires in the source MSC 110, the source MSC 110 deregisters the UE 100. The time supervision is stopped, if a cancel location message is received before expiry of the time supervision. This case is not depicted in the figure. So if a Cancel Location message manages to get across the intermediate network 120 and is received by the source MSC 110, the source MSC 110 stops the LCSUP timer. The deregistration of the UE 100 is then triggered by the reception of the Cancel Location message, and the source MSC 110 returns a Cancel Location Acknowledgement message to the HLR 130.

If the Cancel Location message is received by the source MSC 110 for the UE 100 after the LCSUP timer has expired and the UE 100 is deregistered, the cancel location message is ignored, expect for an acknowledgement to the HLR 130. This case is not depicted in the figure. So the UE 100 may already be deregistered, and all information about the UE 100 and the subscriber using the UE 100 may have been deleted from the source MSC 110. So if a Cancel Location message is received by the source MSC 110 for an unknown UE, this Cancel Location message is ignored. However, in order to not confuse the HLR 130, preferably a Cancel Location Acknowledgement message is returned to the HLR 130.

If a location updating request is received from the UE 100 while the time supervision is running, the time supervision is stopped and the location updating request is treated like a location update request from a UE being new in the source MSC 110. This case is not depicted in the figure. There might be a case that the location update of the UE 100 in the target MSC 140 fails, or the UE 100 is quickly roaming back to the source MSC 110. The UE 100 may then perform location update again towards the source MSC 110. As the LCSUP timer is still running, the source MSC 110 can derive that there is an issue with the reception of the Cancel Location message from the HLR 130 and treat this location update request of the UE 100 like a request from a new UE in the source MSC 110 area. This means that the source MSC 110 stops the LCSUP timer, sends an update location message to the HLR 130, and receives as a response subscriber data for the UE 100 from the HLR 130. So the HLR 130 is correctly informed that the UE 100 has returned to the source MSC 110.

If a terminating transaction request is received for the UE 100 while the time supervision is running, the terminating transaction request is handled as a transaction to a not reachable UE. A terminating transaction request may be any one of a terminating call request, a terminating short message request, a terminating location request, or a terminating unstructured supplementary service request. This case is not depicted in the figure. There might be a case that a terminating transaction request is received in the source MSC 110 for the UE 100 while the LCSUP timer is running. As the LCSUP timer is still running, the source MSC 110 can derive that there is an issue with the reception of the Cancel Location message from the HLR 130 and the source MSC 110 shall not start to handle the terminating transaction request as it would anyway fail with a high likelihood. Therefore the source MSC 110 handles the terminating transaction request as if the UE 100 was not reachable. So for example, a terminating call request would be rejected with an indication that the subscriber is not reachable. Or, if the subscriber has configures a forwarding service on a not reachable condition, the call would be forwarded to the configured not reachable forwarded-to destination.

Figure 3:
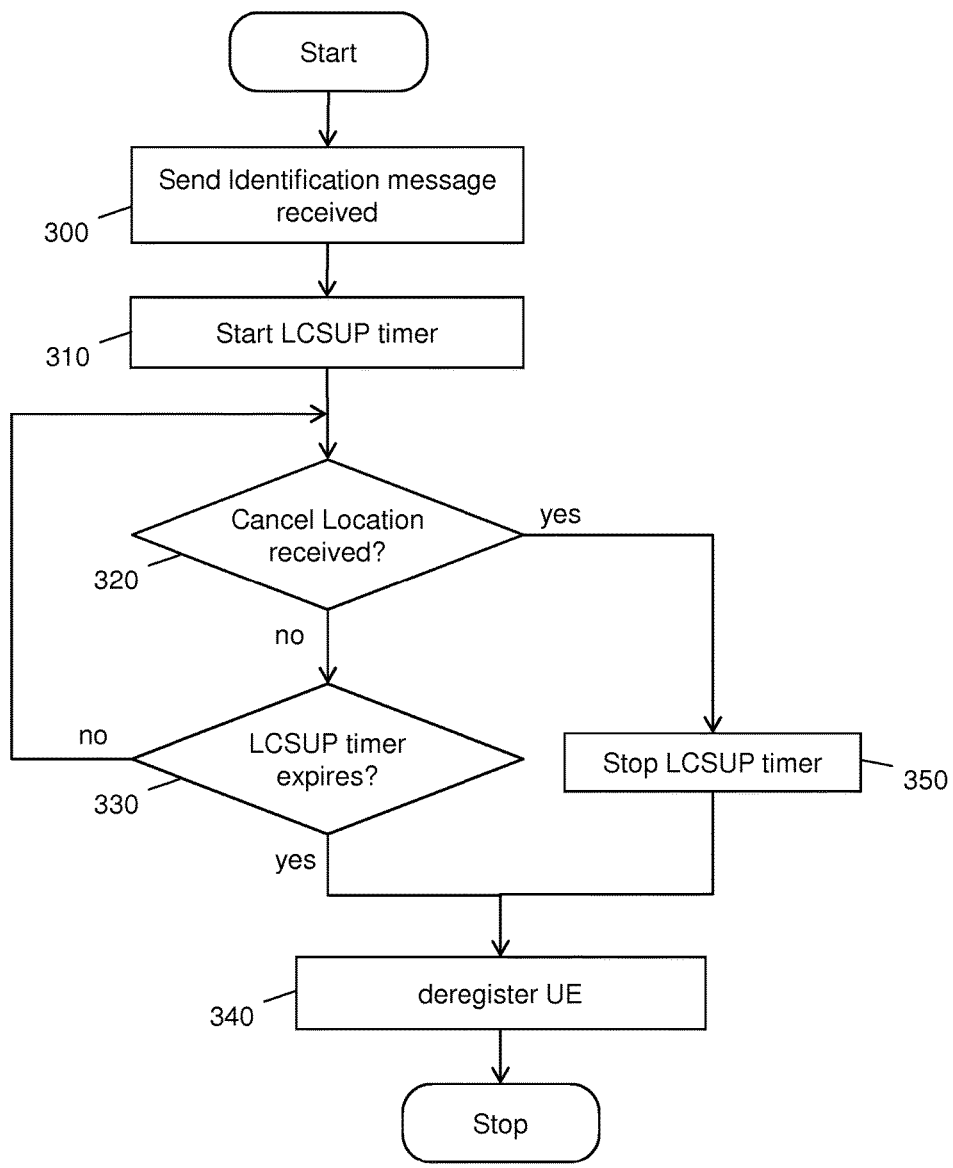
FIG. 3 shows a flow diagram in a source control node for deregistration of a user equipment from the source control node according to the invention.

Referring now to FIG. 3, this figure shows a flow diagram in a source MSC for deregistration of a UE from the source MSC according to an embodiment.

The flow may start with the reception 300 of a Send Identification message requesting identification and security related information. The Send Identification message may correspond to a MAP message Send Identification 210.

In step 310 the source MSC 110 identifies the UE 100 based on information received in the Send Identification message and starts a time supervision, here exemplified by an LCSUP timer as explained above with respect to FIG. 2.

Now a loop is entered where the source MSC 110 waits for the reception of a Cancel Location message or that the LCSUP timer expires.

In step 320 it is checked whether a Cancel Location message was received. If the answer is no, the flow proceeds to step 330. If the answer is yes, step 350 is performed, in which the LCSUP timer is stopped and the execution continues with step 340.

In step 330 it is checked whether the LCSUP timer expires or has expired, i.e. whether the time supervision is expired. If the answer is no, a jump to the beginning if the loop is performed and again step 320 is performed. If the answer is yes, step 340 is performed.

In step 340 the UE 100 is deregistered and the flow ends.

Figure 4:
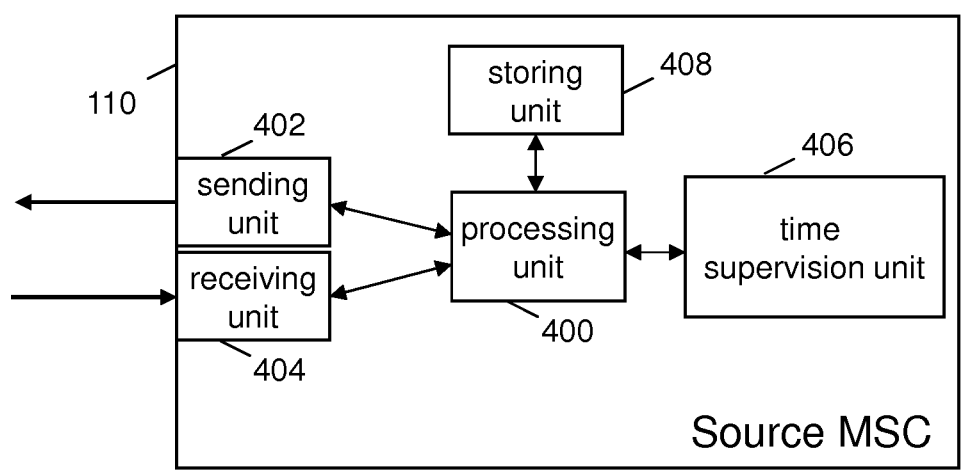
FIG. 4 is a block diagram illustrating a source control node according to the invention.

Referring now to FIG. 4, this figure shows a block diagram illustrating a source control node according to an embodiment. The illustrated entity may correspond to the source MSC 110. The source MSC 110 may be adapted to perform one or more steps of the above described method shown in FIG. 3.

The source MSC 110 comprises processing circuitry, such as one or more microprocessors or other digital processing circuits. This processing circuitry may be viewed as comprising a number of functional units, which are described in further detail below and which are adapted or configured to carry out the processing operations described herein.

A processing unit 400 of the source MSC 110 may be adapted to receive an identification request message from the target MSC 140, the identification request requesting identification and security related information. The processing unit 400 of the source MSC 110 may be further adapted to start, triggered by the identification request message, a time supervision supervising a reception of a cancel location message from the HLR 130. The processing unit 400 of the source MSC 110 may also be adapted to deregister, when the time supervision expires, the UE 100 from the source MSC 110. In a practical implementation the processing unit 400 may be one processor taking care of all the above functions, or may also be distributed over more than one processor, wherein the functions are distributed over the available processors.

The source MSC 110 may further comprise a sending unit 402 and a receiving unit 404 via which the source MSC 110 can communicate with other entities such as the UE 100, the HLR 130, or the target MSC 140. The sending unit 402 may send out signaling messages composed by the processing unit 400. The receiving unit 404 may receive signaling messages originating from the UE 100, the HLR 130, or the target MSC 140, and forward the received signaling messages to the processing unit 400 for handling. The source MSC 110 may comprise more than one sending unit and receiving unit for signaling capacity and redundancy reasons.

The source MSC 110 may further comprise a time supervision unit 406 for handling time supervision tasks. The time supervision unit 406 may implement the LCSUP timer used to time supervise the reception of a Cancel Location message for a UE 100. A timer may for example be implemented by a periodic interrupt signal from a system clock and a counter, or by a processor clock of the procession unit 400 and a shift register. A timer in the time supervision unit 406 may be instantiated, started, stopped, reset, and removed by instructions from the procession unit 400.

The source MSC 110 may also comprise a storing unit 408 for storing information related to the transcription of sessions. The storing unit 408 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 408 may be used by the processing unit 400 to store information such as subscriber data, or program code.

According to one or more embodiments, a non-transitory computer-readable medium stores a computer program for execution by the processing unit 400 of the above mentioned entity 110, such that a method for deregistration of a user equipment from the source control node as described above with reference to FIG. 3 is carried out or be controlled at least in part based on program execution. In particular, the entity 110 may be caused to perform processing operations corresponding to the above-described method, based on executing the computer program.

The computer program may be embodied as a computer program product that is stored, for example, on a disk or the storing unit 408 of the entity 110.

Figure 5:
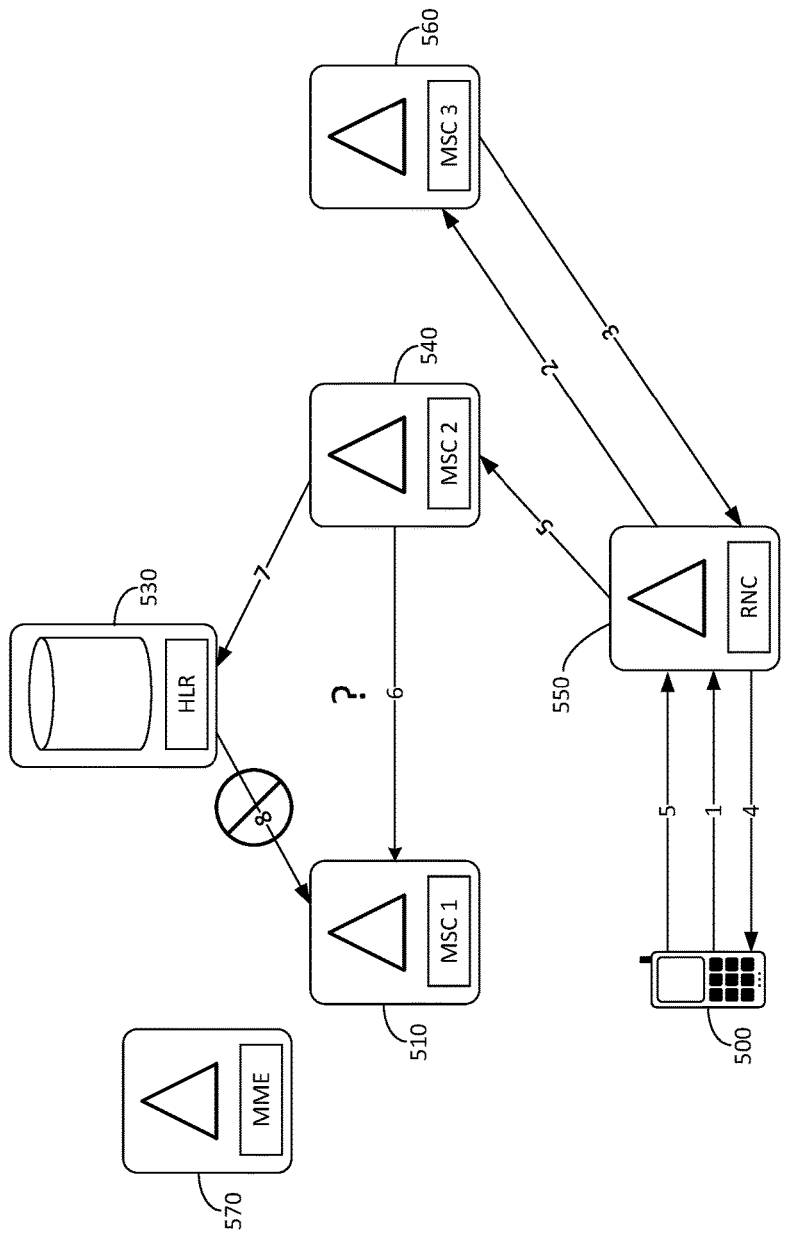
FIG. 5 is a diagram showing message flow in a procedure of deregistration of a user equipment.

FIG. 5 shows a message flow in a scenario of a mobile originated CS fallback call during signaling outage of a source MSC 510. In the context of FIG. 5, user equipment (UE) 500 may correspond to user equipment 100, source MSC 510 may correspond to source MSC 110, target MSCs 540, 560 may correspond to target MSC 140, and HLR 530 may correspond to HLR 130 as described in connection with FIGS. 1 to 4.

In the depicted messaging flow, UE 500 starts an originating call having a TMSI assigned from source MSC 510. Radio Network Controller (RNC) 550 finds out that there is a signalling outage towards source MSC 510 and for that reason it cannot send the message to source MSC 510. It applies a round robin algorithm and sends the message to target MSC 560. However, in the depicted example, target MSC 560 has no VLR record of the specific subscriber to which UE 500 belongs and rejects the call with a CM SERVICE REJECT message with cause IMSI unknown in VLR.

Upon reception of the CM SERVICE REQUEST with the specific cause, the UE 500 triggers a Location Update attempt towards RNC 550. Thereupon, RNC 550 will apply again the round robin algorithm since source MSC 510, where the current TMSI of the UE belongs, still has a signalling outage. So due to round robin the Location Update (LU) request is sent to target MSC 540. Thereby, target MSC 540 will receive a LU that contains a previous LA that is within the pool (consequently an own LA for target MSC 540) and a TMSI that contains an NRI value that belong to another MSC, namely source MSC 510, of the pool. It is noted that this specific combination can only occur when the MSC where the specific NRI belongs to—here, source MSC 510—, is out of service.

Target MSC 540 then sends a SEND IDENTIFICATION message to source MSC 510 as part of the fetch of cooperating VLR data. Upon reception of this SEND IDENTIFICATION message, source MSC 510 checks if the subscriber using UE 500 for which the SEND ID message is sent is registered and EPS attached. If it is, source MSC 510 resets the radio confirmation flag and deletes the subscriber's TMSI from VLR. Then it will return back the SEND ID RESP.

At this point and after the release of the call the subscriber resp. UE 500 will return back to LTE access and MME 570 will perform a new EPS attachment attempt towards source MSC 510. That attempt will lead to LU towards HLR 530 and a new TMSI allocation.

However it is possible that the SEND IDENTIFICATION message will not reach source MSC 510 due to the above-mentioned signalling failure. So if target MSC 540 does not get an answer to the SEND IDENTIFICATION message, it may mark the specific subscriber of UE 500 as "suspect" of having a dual VLR record problem and store the old NRI that points to source MSC 510. In such a case, UE 500 can perform originating traffic via target MSC 540, but the subscriber of UE 500 may not be able accept any terminating traffic. Note that the "dual VLR record problem" refers to a UE as potentially having a double record in a VLR.

It is noted that the above-mentioned steps of sending a location update request and SEND IDENTIFICATION message may also be performed in case the CSFB call is received via Location Update message (due to change of LAI).

Figure 6:
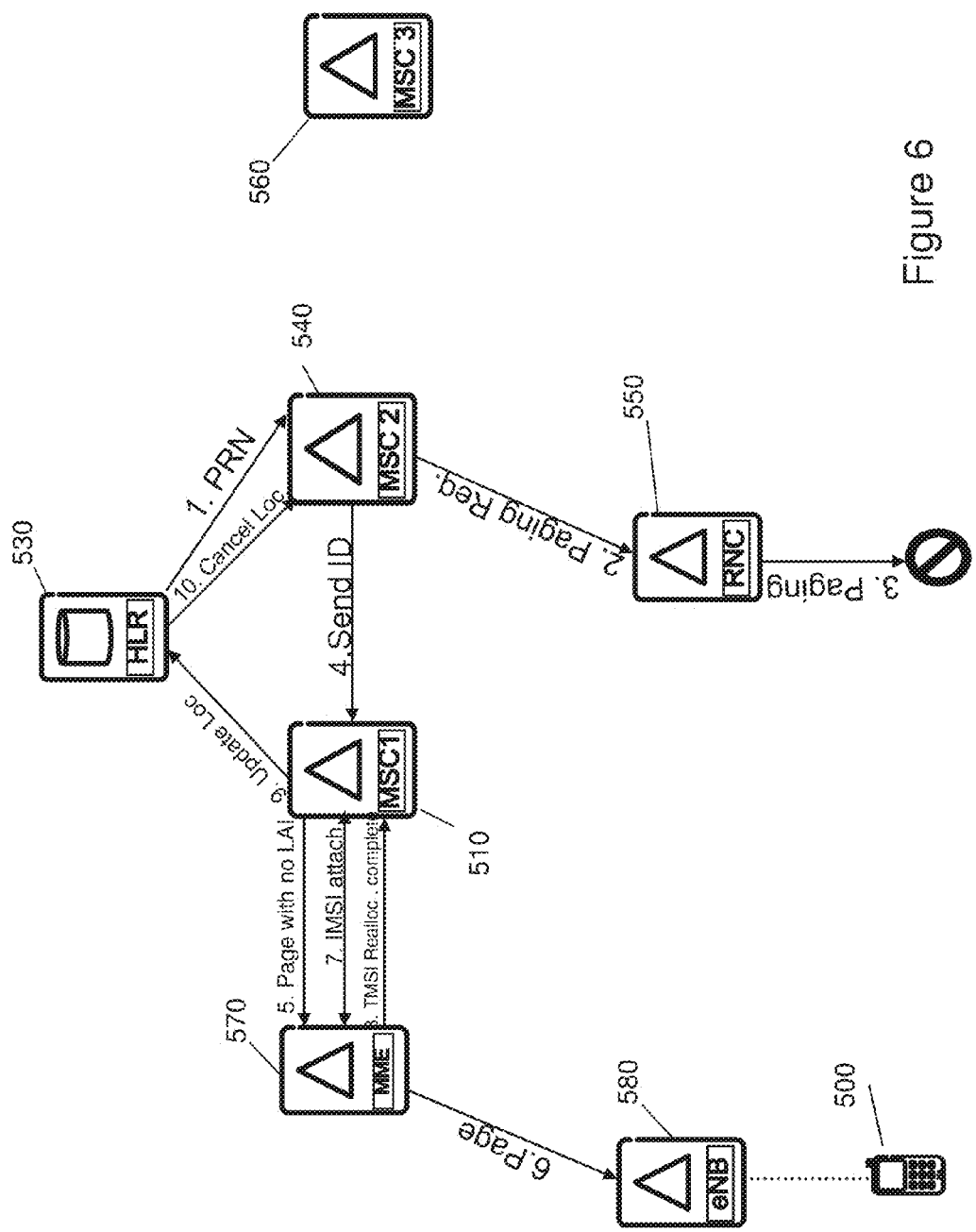
FIG. 6 is a diagram showing another message flow in a procedure of deregistration of a user equipment.

FIG. 6 depicts a message flow for a mobile terminating service request. This message flow may be employed for the case described with respect to FIG. 5 when a potential dual VLR record exists. Accordingly, reference numbers corresponding to the ones of FIG. 5 are used.

In the example of FIG. 6, a terminating call for a subscriber—using UE 500—is received. This UE 500 may be marked in target MSC 540 as having a potential dual VLR record. HLR 530 sends the call via PRN message to the MSC that the subscriber was registered after the signalling outage, i.e. to target MSC 540, since this was the last one that had performed an Update location to HLR 530. Target MSC 540 accordingly replies with PRN ACK and, upon reception of IAM message, pages the subscriber using UE 500, according to generally known procedures.

If the paging for this subscriber, resp. UE 500, fails (for example because the subscriber is roaming under LTE access) target MSC 540 checks if the subscriber is marked as "suspect" for dual VLR registration. If that is the case, target MSC 540 sends a new SEND IDENTIFICATION message to source MSC 510 based on the stored old NRI. The SEND IDENTIFICATION message may include a new proprietary parameter (i.e. subscriber's IMSI). Upon reception of the SEND IDENTIFICATION message with the proprietary parameter, source MSC 510 checks if the specific IMSI received corresponds to an EPS attached subscriber. If it does, MSC 510 resets the radio confirmation flag and deletes the TMSI from VLR. MSC 510 may then send the SEND IDENTITY RESPONSE to MSC 540 and shall perform a "dummy" paging without an LA towards MME 570.

Upon the reception of a SEND IDENTITY RESPONSE indicating "Unidentified subscriber", target MSC 540 may reset the "suspect" flag and the NRI of source MSC 510. In any other case, target MSC 540 may keep the specific subscriber as "suspect" of having the dual VLR record problem as well as the old NRI that points to source MSC 510. Anyway, target MSC 540 will receive a CANCEL LOCATION from HLR 530 after the location Update via SGs interface has been received in source MSC 510, resulting in the subscriber being deregistered from target MSC 540.

Then, as paging without LA has occurred in this example, MME 570 may, according to the provisions of 3GPP TS 23.272, re-attach UE 500 to source MSC 510. Since source MSC 510 may have no valid TMSI for the subscriber, it may send a new TMSI to the UE 500. Just as well, MSC 510 may have the radio confirmation flag off and may thus send a UPDATE LOCATION to HLR 530. This Update Location to HLR 530 finally results in sending of a Cancel location message to target MSC 540, and consequently delete the second VLR registration of UE 500.

This procedure may be applied for any terminating transaction (i.e SMS, Location Service etc.).

Generally, the procedures described with respect to FIGS. 5 and 6 may or may not be performed in conjunction with the procedures described with respect to FIGS. 2 and 3; i.e. a timer-based de-registration of a subscriber as mentioned above and explained in detail with FIGS. 2 and 3 may additionally be done in the procedures of FIGS. 5 and 6.

One or more embodiments as described above may enable at least one of the following technical effects:

Safely deregistering a UE from a source MSC, even if the Cancel Location Message from the HLR gets lost.

Enabling network consistency by ensuring that at any given time only a single MSC holds a valid registration for a certain UE.

Enabling network consistency by ensuring that at any given time the HLR has valid information on the location of the UE.

Saving network and node capacity as no invalid UE registrations are maintained.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a first control node configured for operation in a first mobile communications network, the method comprising:

receiving an identity request message sent from a second control node in association with the second control node receiving a location update request for a roaming user equipment, the first control node being responsible for a first location area within the first mobile communications network and the second control node being responsible for a different, second location area within the first mobile communications network or within a second mobile communications network;

determining from a temporary identifier included for the user equipment in the identity request message that the user equipment is currently registered with the first control node, and, in response:

sending an identity acknowledgment message to the second control node that includes identification information corresponding to the user equipment;

starting a deregistration timer; and while the deregistration timer is running, waiting for receipt of a cancel location message from a Home Location Register (HLR) associated with the user equipment; and deregistering the user equipment from the first control node responsive to the earlier of:

reception of the cancel location message; and expiration of the deregistration timer.

2. The method of claim 1, further comprising, in response to receiving the cancel location message after deregistration of the user equipment has already occurred at the first control node, sending an acknowledgement of the cancel location message back to the HLR but otherwise ignoring the cancel location message.

3. The method of claim 1, further comprising, in response to receiving a location update request from the user equipment while the deregistration timer is running and before reception of the cancel location message, stopping the deregistration timer and initiating a new registration of the user equipment in the first control node, including sending a location update message towards the HLR of the user equipment.

4. The method of claim 1, further comprising, in response to receiving a terminating call request or other terminating transaction request for the user equipment while the deregistration timer is running and before reception of the cancel location message, rejecting the terminating transaction request with an indication that the user equipment is unreachable.

5. A first control node configured for operation in a first mobile communications network, the first control node comprising:

communication circuitry configured for communicating with a second control node in the first mobile communications network or in a second mobile communications network; and processing circuitry operatively associated with the communication circuitry and configured to:

receive an identity request message sent from the second control node in association with the second control node receiving a location update request for a roaming user equipment, the first control node being responsible for a first location area within the first mobile communications network and the second control node being responsible for a different, second location area within the first mobile communications network or within the second mobile communications network;

determine from a temporary identifier included for the user equipment in the identity request message that the user equipment is currently registered with the first control node, and, in response:

send an identity acknowledgment message to the second control node that includes identification information corresponding to the user equipment;

start a deregistration timer; and while the deregistration timer is running, wait for receipt of a cancel location message from a Home Location Register (HLR) associated with the user equipment; and deregister the user equipment from the first control node responsive to the earlier of:

reception of the cancel location message; and expiration of the deregistration timer.

6. The first control node of claim 5, wherein, in response to receiving the cancel location message after deregistration of the user equipment has already occurred at the first control node, the processing circuitry is configured to send an acknowledgement of the cancel location message back to the HLR but otherwise ignore the cancel location message.

7. The first control node of claim 5, wherein, in response to receiving a location update request from the user equipment while the deregistration timer is running and before reception of the cancel location message, the processing circuitry is configured to stop the deregistration timer and initiate a new registration of the user equipment in the first control node, including sending a location update message towards the HLR of the user equipment.

8. The first control node of claim 5, wherein, in response to receiving a terminating call request or other terminating transaction request for the user equipment while the deregistration timer is running and before reception of the cancel location message, the processing circuitry is configured to reject the terminating transaction request with an indication that the user equipment is unreachable.

* * * * *